Jan. 11, 1955  T. NIETER  2,699,425
ELECTROPLATING ELECTRICAL CONDUCTORS ON AN INSULATING PANEL
Filed July 5, 1952  2 Sheets-Sheet 1

SAND BLASTING — AIR BLOWING — WATER SPRAY RINSING — CHEMICAL SENSITIZER SPRAY — WATER SPRAY RINSING — SIMULT. SPRAY METAL SALT SOLUTION & SALT REDUCING SOLUTION — WATER SPRAY RINSING — AIR DRYING

INVENTOR.
Temple Nieter
BY
Foorman L. Mueller
Atty.

Jan. 11, 1955     T. NIETER     2,699,425
ELECTROPLATING ELECTRICAL CONDUCTORS ON AN INSULATING PANEL
Filed July 5, 1952     2 Sheets-Sheet 2
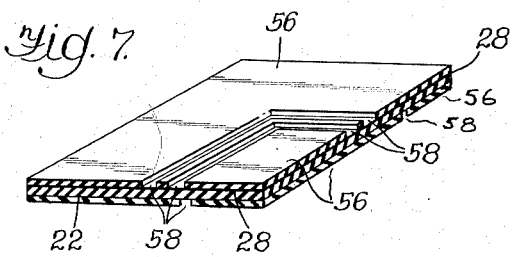
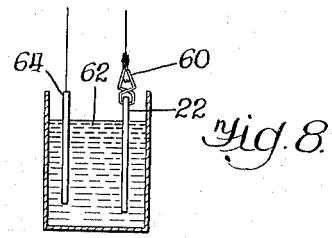
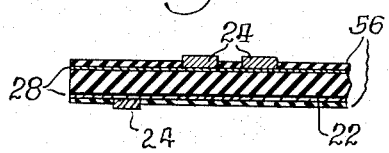
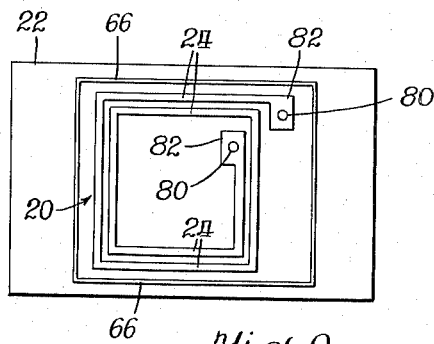
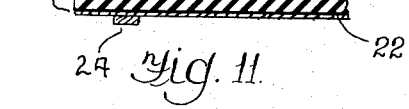
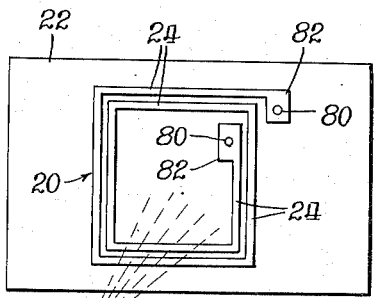
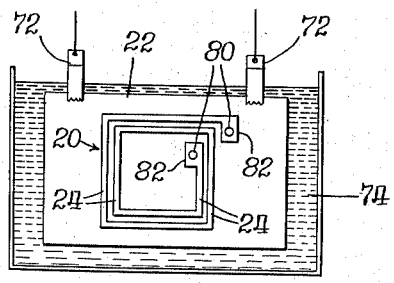
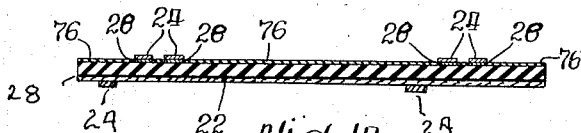
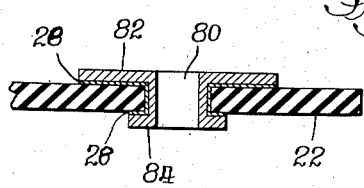
INVENTOR.
Temple Nieter
BY
Foorman L. Mueller
Atty.

United States Patent Office 2,699,425
Patented Jan. 11, 1955

2,699,425

ELECTROPLATING ELECTRICAL CONDUCTORS ON AN INSULATING PANEL

Temple Nieter, Evanston, Ill., assignor to Motorola, Inc., Chicago, Ill., a corporation of Illinois Application July 5, 1952, Serial No. 297,285

6 Claims. (Cl. 204—18)

This invention relates to methods of forming electric conductors on insulating bases, and particularly to methods for the deposition of electric conductors by electro-chemical action upon insulating bases.

This application is a continuation in part of co-pending application Serial No. 120,165, filed October 7, 1949, in the name of Temple Nieter, entitled "Electroplating Process" and assigned to the present assignee.

In forming an electric conductor upon an insulating base, it has been proposed to coat the base uniformly with a thin layer of electrically conductive material (such as silver), then mask those areas of the coated base on which no conductor is desired, and electroplate the remaining areas with a second layer of a different conductive material (such as copper) to form the electrical conductor. Thereafter, both the masking material and the unplated underlying parts of the first conductive layer are removed, leaving only the desired conductor on the insulating base. Prior methods of this character have been subject to several disadvantages. The masking materials required by such prior methods have not been capable of resisting prolonged electrolytic action to the extent necessary for effectively preventing the deposition of metal where it is not wanted on the base. Moreover the agent that has been used for removing the unwanted parts of the first layer are likely to attack the second layer also, resulting in an unsatisfactory product. Great difficulty was also encountered in the prior art in affixing the metallic layers to the insulating base with sufficient adhesion to produce a commercially acceptable product for electronic purposes.

An object of the present invention is to provide an improved method of forming electric conductors on insulating bases which avoids the disadvantages just mentioned.

A further object of the invention is to provide such an improved method of forming electric conductors on insulating bases which is simple and expedient in its nature and which produces a commercially acceptable product.

Another object is to provide a simple and reliable method of forming electric conductors on insulating bases, which method entails the use of cheap, common materials and inexpensive production techniques.

Still another object is to produce an electroplated pattern on an insulating base with a high degree of precision.

A further object is to produce an electric conductor on an insulating base by a combination of silver coating and copper plating steps, and to remove the excess silver with no detrimental effect upon the copper plating.

A feature of the invention is the use of a silk screen stencil and a suitable resist for marking certain areas of a silver coated insulating base prior to the immersion of the base in an electroplating bath. The screening of the resist directly upon the desired areas of the base is found to be more satisfactory than prior methods of forming a mask or negative since it enables, for example, a relatively thick layer of highly plasticized lacquer to be used which is resistant to copper break-through and maintains such resistance throughout the process owing to its retention of original thickness because a minimum percentage of solvent is present to be lost upon drying. This constitutes an important feature of the invention since screening of the resist enables resist materials to be used that maintain sufficient thickness throughout the plating process not only to prevent break-through of the copper but also to provide relatively deep, straight-sided channels for subsequent copper deposits. The techniques of the prior art, which use a light sensitive material as the resist and derive the pattern for the electrical conductors by photochemical means, have proved generally unsatisfactory as such material is susceptible to copper break-through since it is difficult to get a sufficiently thick layer thereof and still to obtain well-defined electrical conductors in an intricate design.

A further feature of the invention is the use of an insulating base having one or more apertures therein, and the plating of conductors on both sides of the base and the plating of the edges of the apertures in accordance with the process of the invention so that an electric connection may be made through the base to the conductors on both sides, and that electric connection also serves to securely hold the conductors on the base.

An additional feature is the novel manner of removing excess silver which involves the use of a cheap conversion agent (such as ordinary bleach, sodium hypochlorite) that converts the silver to a non-conductive material which is readily soluble in a common cleaning agent (such as sodium thiosulphate or ammonia) without affecting the deposited copper. In an alternative form of the invention, a chromic acid solution is employed for converting the unplated silver film into a chromate that is readily removed from the base without affecting the copper deposit.

The foregoing and other objects and features will be better understood from a study of the following description taken in conjunction with the accompanying drawings, wherein:

Fig. 7 is a perspective view, partially sectional illustrating the stencilled base after the operation associated with Figs. 5 and 6;

Fig. 8 represents the electroplating step in the process affecting the base of Fig. 7;

Fig. 9 is a plan view of a modification which employs a guard ring, stencilled at the same time as the rest of the pattern, to improve the electroplating;

Fig. 10 is a cross-section of the electroplated article prior to the removal of the resist;

Fig. 11 is a sectional view representing the article after the removal of the resist;

Fig. 12 is a schematic view representing the step of removing the resist;

Fig. 13 represents schematically the equipment for the step of treating the article with a conversion agent;

Fig. 14 is a cross-section of the article after being treated with the conversion agent; and Fig. 15 is a fragmentary section on the line 15—15 in Fig. 1, showing the configuration of a terminal socket applied to a base completed according to the present process.

In practicing the invention, an insulating base is prepared to have a conductor in a predetermined pattern applied thereto in a firmly adhering fashion. A silk screen stencil is prepared with the pattern thereon corresponding to that ultimately desired for the conductor on the base. The insulating base is roughened and silvered, and a resist is then squeegeed onto the silver coated base through the silk screen stencil. This serves to mask those areas of the silvered base on which no conductor is desired, leaving unmasked those areas on which a conductor or conductors (or a guard ring) may be desired. After the resist is deposited, the article is placed in an electroplating bath to deposit copper on the exposed silver areas. The copper is built up to the requisite thickness, and the resist is then removed, leaving bare the unplated portions of the silver coating. The unplated silver may be removed by brushing or acid etching, or more preferably, a conversion agent such as bleach or chromic acid is applied to the article converting the exposed silver to a non-conductive material which is soluble in a cleaning agent such as photographer's hypo (sodium thiosulphate) or ammonia. The finished article, after cleaning, consists of the insulating base bearing copper strip conductors which are superimposed upon metallic silver, with the silver being confined in its extent to the areas underlying the copper conductors.

To simplify the description so far, the process is explained as coating only one side of the base, and this represents one commercial embodiment of the invention. However, a preferred form comprises the preparing, treating, plating, and cleaning steps simultaneously practiced at each step on both sides of the insulating base, and this greatly enlarges the commercial application of the invention.

Figure 1:
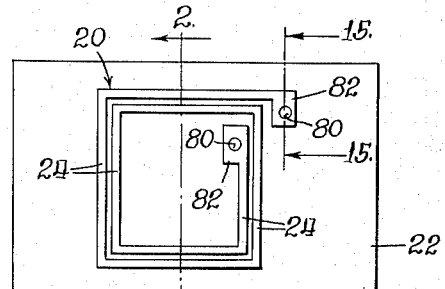
Figs. 1 and 2 are plan and cross-sectional views, respectively, of an article made in accordance with the principles of the invention.
Figure 2:
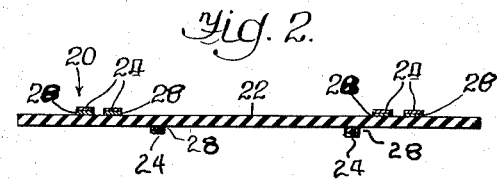
Figure 3:
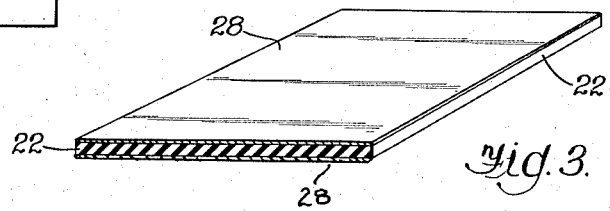
Fig. 3 is a perspective view, partly sectional, showing an insulating base which has been coated with silver in the first portion of the complete disclosed process.

Figs. 1 and 2 illustrate a fixed tuning coil 20 adhering to an insulating base 22. The coil 20 may be considered as a single conductor in the form of a loop or, alternatively, as individual interconnected conductors 24 which constitute the turns of the coil and which may be formed on both sides of the base. Each of the conductors 24 consists of a strip of copper which overlies a thin layer or film 28 of silver. The various steps involved in the formation of this article are as follows:

The insulating base 22 is coated uniformly with metallic silver 28 as indicated in Fig. 3 to provide a silver layer or film on the base. This is one step in the sequence of operations illustrated in Fig. 4 and titled there for each step. The apparatus disclosed and claimed in copending application Serial No. 291,131, filed June 2, 1952, in the name of Temple Nieter, entitled "Apparatus for Coating a Plurality of Members in a Continuous Order" and assigned to the present assignee, will perform all of the steps illustrated in Fig. 4. However, the specific preparing steps prior to silvering include roughening and cleaning the base 22 by a sandblast 11 from nozzle 10. It is to be understood that the term "sandblasting" is used herein in its generic sense to refer to any abrasive blast such as sand, aluminum oxide and the like. It is most desirable that the surface of base 22 be roughened to increase the adherence of the silver coating to the surface thereof and overcome one of the most prevalent problems of the prior art. Best results have been observed when a very fine sand such as 220–240 grit is used. After the sandblasting operation is completed, air is blown onto the surface of the insulating base from a nozzle 12 to remove most of the sand particles. The base is then rinsed by a water spray 15 from a nozzle 14 to remove all remaining particles of sand and any other foreign substances from the surface of the insulating base. It is sometimes preferable to add a detergent to the spray rinse to increase its efficiency. Moreover, when so desired, the base may be dipped in water and brushed for rinsing purposes instead of using a spray.

A sensitizing solution 30, such as stannous chloride ($SnCl_2$) is then sprayed from a nozzle 32 onto the base 22. The base 22 is then washed with a water spray 34 from a nozzle 36, leaving a slight trace of the sensitizer on the base. The base 22 is then subjected to a dual spray from the nozzles 38 and 40, one of these sprays being a silver salt solution 42, while the other spray is a salt reducing solution 44. The streams 42 and 44 unite with the chemical sensitizer at the surface of base 22, and the silver salt solution is reduced to metallic silver. The silvered base 22 is washed by a water spray 46 from a nozzle 48 and is dried by an air blast 16 from nozzle 17, producing the silver coated base 22 as illustrated in Fig. 3.

Figure 4:
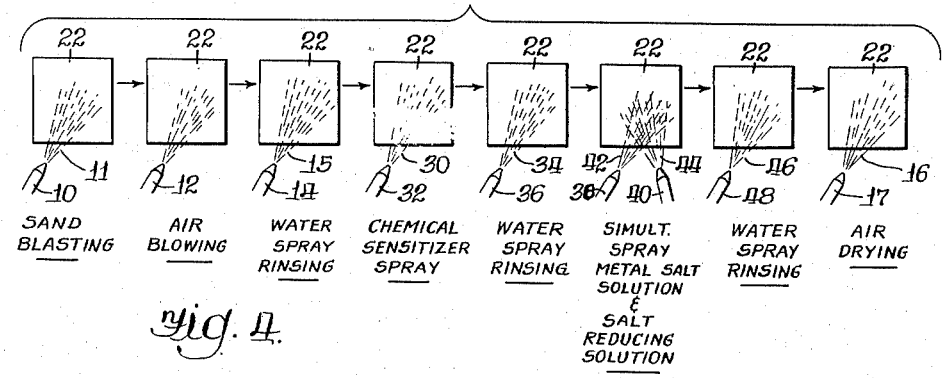
Fig. 4 is a series of schematic views showing various steps involved up through the first portion of the process to provide the article in the preliminary condition illustrated in Fig. 3.

The treatment of only one side of the base 22 has been described, but it is apparent that when it is desired to coat both sides of base member 22, like nozzles may be disposed on the opposite sides thereof for the coating process of Fig. 4.

The optimum thickness of silver on the base 22 is that which produces a resistance of from 1 to 2 ohms as measured between prods one inch apart on an area which need not exceed two inches square. (Any greater area will not alter the resistance appreciably.) If the silver layer is thicker than this, it may not be easily removed after the copper plating step. On the other hand, if the silver layer is too thin, it may not have a sufficiently low resistance to carry the desired copper plating current.

Figure 5:
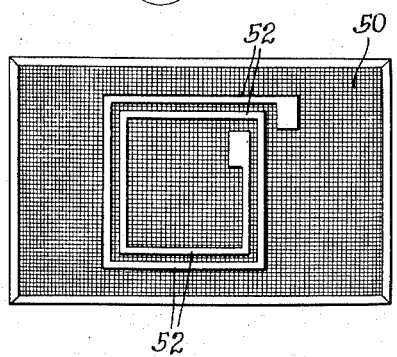
Fig. 5 is a plan view of a silk screen stencil employed for applying resist to the silvered base in a step following those illustrated schematically in Fig. 4.

At this stage it might be said that the second portion of the complete process of this invention is practiced, and this comprises those steps which provide the base with the final conductor. A silk screen stencil 50, Fig. 5, is employed to set the pattern for a resist to be applied to the silver coating. The term "silk screen stencil" is used generically, for other screens having the same property as silk, such as stainless steel screens, may be used. In preparation for making up the screen, the required coil design is first laid out by drafting methods, printing, or in any other suitable fashion, upon a white surface, using black marks wherever the copper conductors are to be formed. The lines may be created originally to any desired scale, such as will permit photographic reduction to the actual required size. The silk screen stencil is prepared by conventional methods from the printed or drafted design, with those areas of the stencil 50 that correspond to the design being blanked off as indicated at 52. Hand cut stencils may be used where suitable.

A suitable resist which is proof against electrolytic action must be employed in masking those areas of the silvered base 22 (Fig. 3) on which copper is not to appear. Highly plasticized unpigmented screening lacquer has been found to be highly satisfactory for this process. This lacquer may be formed from commercial cellulose nitrate lacquer from which a substantial amount of solvent has been driven off by heating and which is mixed, for example, with butyl phthalate so as to be highly plasticized and retain its thickness upon being stencilled. Moreover, when such lacquer is mixed with aluminum powder, it may be quickly dissolved in a caustic bath, as will be described. The stencil 50 is laid upon a base 22, and the lacquer is applied by a squeegee 54 (Fig. 6) or in any other conventional fashion. The use of a screen stencil allows such lacquer or like material to be utilized to provide a greater protective thickness than would printing with resist material or the use of photo sensitive masks as previously described, and in addition produces a clean and sharp pattern on the deposited silver. Another resist that has proved to be highly satisfactory is an alkyd resin paste of the type presently being marketed by the Union Ink Co., of Richfield, N. J. under the trade name of "Silk Screen Heavy Columbia Resist No. A4799."

The lacquered base is shown fragmentarily in Fig. 7; the thickness of the resist relative to the base 22 is exaggerated in this view for clarity. The resist 56 masks all areas of the silver layer 28 on both sides of the base except those corresponding to the position of the conductors 24 (Fig. 1) in the finished product. Thus, referring to Fig. 7, interruptions 58 in the resist layer 56 expose the silver layer 28 wherever copper is to be deposited.

After being coated with the silver 28 and the resist 56, as shown in Fig. 7, the base 22 is air dried and is then ready for copper plating. The article may then be wetted by a suitable wetting agent and suspended by a clip 60 (Fig. 8) in a copper electroplating bath 62. The silver coating 28 on the base 22 forms one electrode. Another electrode 64 is suspended in the bath 62 as shown. The article is kept in the bath subject to electrolytic action for a sufficient length of time to build up the required thickness of copper on the exposed silver areas. As shown in Fig. 10, the copper strips 24 may be built up to a thickness exceeding that of the resist layer 56. If the copper displays any tendency to "grow" excessively around the outermost parts, a guard ring 66 (Fig. 9) may be employed. This guard ring 66 is formed by pattern stencilling and then plating, as in the case of conductors 24, and it absorbs the excessive edge plate current which would otherwise be directed to the conductors 24. The result is a clean, sharply defined conductor.

The composition for the plating bath may be a standard solution such as 30–36 ozs. of copper sulphate per gallon, and 7–9 ozs. of sulphuric acid per gallon, and if brightening is required, half a gram of thiourea may be used per 20 gallons of the final solution. This brightener also tends to prevent side growth of the flat copper strips.

After being electroplated, the article is treated with a suitable solvent to remove the mask or resist 56. As shown in Fig. 12 a solvent spray 68 is directed from a nozzle 70 onto the work for this purpose. When lacquer mixed with aluminum powder is used for the resist, the article may be dipped in a caustic solution which attacks the aluminum and rapidly dissolves the resist, leaving clean silver surfaces. When the masking layer has been thoroughly removed, the article appears in section as shown in Fig. 11, with the copper strips 24 covering certain areas of the silver layer 28. The silver is exposed in those areas that are not covered by copper.

The next step is to remove the exposed silver, and this may be done by mechanically or manually brushing the article with a stiff bristle brush which removes the exposed silver but does not materially affect the copper plating. Any particles of silver that might remain after the brushing operation may be removed by etching with nitric acid. Alternately, all the exposed silver may be removed by etching with nitric acid, but care must be taken that the acid does not attack the copper plate.

A preferred means for removing the exposed silver is to subject the copper plated article to the action of a conversion agent which renders the exposed silver electrically non-conductive and soluble in a cleaning agent. Fig. 13 represents the article 22 (Fig. 11) suspended by clips 72 in a bath 74 containing a converter. Excellent results have been obtained by using ordinary bleach (sodium hypochlorite, NaOCl) as a converter. As far as can be observed, the bleach does not react chemically with the copper strip 24, but it changes the exposed silver layer 28 to a layer of non-conductive material 76 (Fig. 14). This converted silver compound 76 (Fig. 14), may be left on the base 22 if desired, inasmuch as it is a good insulator. Preferably, however, it is removed. A useful property of this compound is its solubility in photographer's "hypo" (sodium thiosulphate, $NA_2S_2O_3$) or in ammonia (ammonium hydroxide, $NH_4OH$). Such cleaning agents do not affect the copper 24 for the short time contact, nor do they undercut the individual silver layers 26 beneath the copper. They remove the silver compound 76 to the edge of each conductor 24, leaving the bare insulating base 22 with clean, sharply defined conductors thereon. The end result is as shown in Fig. 2, with the understanding again, that this process lends itself particularly to two-sided treating and plating on the insulating base, but it can also be confined to one side.

Another conversion agent which may be employed in lieu of sodium hypochlorite, is a solution of chromic acid ($Cr_2O_3$) with about 10% sulphuric acid (optional). This converts the unplated silver to a chromate which is readily wiped off with water, or which disappears in a "hypo" solution. Chromic acid has far less effect upon the copper plating than do other acid solutions (such as nitric acid) which have been used in the past. However, it may tend to remove a slight amount of copper. To circumvent this, the copper strips may be silver plated by immersion in the manner suggested above before the article is subjected to the action of the converter. During the short time that the converter is in operation, it will exhaust itself upon the silver and leave the copper practically unaffected.

Terminal holes 80 (Fig. 1) may be formed in the base 22. These holes are surrounded by wide end portions 82 of the looped conductor 24. When the base 22 is coated with silver by spraying both sides in unison in the operations of Fig. 4, all surfaces are covered, including edges and bores of holes. Masking is applied to both parallel plane major surfaces, one stencil screen for each flat side, thus controlling the coppered areas. When the work is copper-plated, the copper lines each hole 80 and forms a small eyelet 84, Fig. 15, around the hole 80 on the reverse side of the base 22. This affords good electrical contact for a terminal inserted in the hole 80, and also helps to anchor the terminal portion 82 of the copper strip to the base 22.

In illustrating invention, a relatively simple conductor pattern has been shown. It is obvious, of course, that the principles of the invention can be applied to any complex design. Isolated conductors can be formed on the same insulating base in a single operation. Conductors may be formed likewise on both sides of the base, and electrically interconnected through holes such as 80. This may be useful, for example, where it is desired to run a conductor along one side of the base for a distance, then continue the conductor on the other side of the base to avoid a short circuit. The deposited metal lining the hole interconnects the two displaced parts of the conductor under these circumstances. Many other applications of the invention will be evident to those skilled in the art.

When the hypo solution which is used for removing the silver compound from the base becomes saturated, it can be used as a bath to silverplate the copper conductors 24. The article is immersed in the hypo, and when it is removed therefrom, the copper strips will have silver coatings thereon. This facilitates soldering and protects the copper from corrosion. The article may then be dipped in a bath of water dip lacquer to provide temporary protection against tarnish.

Figure 6:
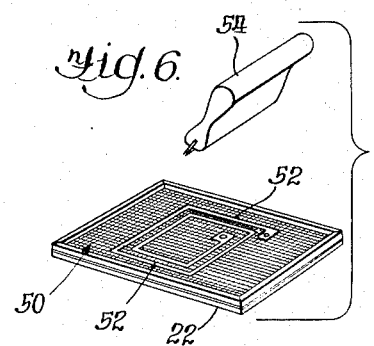
Fig. 6 is a simplified somewhat schematic view of printing equipment used for stencilling the base with resist.

The novel combination of steps in the disclosed method of forming conductors upon an insulating base has proved very successful in practice. Particularly, the application of resist to the metal coated base through a stencil screen, as shown in Fig. 6, provides a thick layer of resist that does not break down in the electroplating operation, and also provides sharply defined walls for the copper conductors so that intricate circuit designs may be obtained. Furthermore, the use of conversion agents, such as those specified herein, having no perceptible effect, or only a very weak effect, upon copper for eliminating the excess silver, is believed to be an important advance in the art. In all, use of such process enables insulating bases to be fabricated with intricate and closely spaced designs of electrical conductors plated thereon, the resulting article being eminently suited for electronic applications. Moreover, the inherent simplicity of the process renders the commercial fabrication of such articles feasible, and overcomes the disadvantages and problems that have long retarded the use of printed circuits in radio and television receivers, and similar apparatus.

While particular embodiments of the invention have been shown and described, modifications may be made and it is intended in the appended claims to cover all such modifications as fall within the true spirit and scope of the invention.

I claim:

1. A process for forming electrical conductors upon both sides of a thin insulating panel which has a plurality of apertures therein with certain ones of the electrical conductors on at least one side of the panel being isolated from one another, and for forming conductive linings in the apertures adapted to receive terminal connections and adapted to interconnect certain ones of such conductors on opposite sides of the panel, which method includes spraying a metal compound solution and a reducing solution onto the surfaces of both sides of the panel and onto the bores of the apertures in the panel to coat such surfaces and bores with a continuous metallic base layer, with the base layer forming a conductive lining for the apertures of a thickness small as compared with the cross-sectional dimensions of the respective apertures, applying resist material to said base layer on both sides of the panel to mask against electroplating portions of the surfaces thereof on which no final conductor is to appear and to leave uncovered the apertures and those portions of the surfaces on which final conductors are to appear with certain ones of the uncovered portions on at least one side of the panel being isolated from one another and with certain ones of the uncovered portions on both sides of the panel extending to corresponding ones of the apertures, coating a second metallic layer on said uncovered portions of said base layer by electroplating, with said second metallic layer extending through the apertures on the bores thereof and leaving an opening through each such aperture of sufficient size to receive the aforementioned terminal connections, and removing from the surfaces of the insulating panel said resist material and the portions of said metallic base layer underlying said resist material.

2. A process for forming electrical conductors upon both sides of a thin insulating panel which has a plurality of apertures therein with certain ones of the electrical conductors on at least one side of the panel being isolated from one another, and for forming conductive linings in the apertures adapted to receive terminal connections and adapted to interconnect certain ones of such conductors on opposite sides of the panel, which method includes, treating the surfaces of both sides of the panel to increase the adhesion characteristics of such surfaces, spraying a chemical sensitizer on the treated surfaces of both sides of the panel and onto the bores of the apertures therein, dual spraying a metal salt solution and a reducing solution onto the treated sensitized surfaces of both sides of the panel and onto the bores of the apertures in the panel to coat such surfaces and bores with a continuous metallic base layer, with the base layer forming a conductive lining for the apertures of a thickness small as compared with the cross-sectional dimensions of the respective apertures, applying a resist material to said base layer on both sides of the panel to mask against electroplating portions of the surfaces thereof on which no final conductor is to appear and to leave uncovered the apertures and those portions of the surfaces on which conductors are to appear with certain ones of the uncovered portions on at least one side of the panel being isolated from one another and with certain ones of the uncovered portions on both sides of the panel extending to corresponding ones of the apertures, coating a second metallic layer on said uncovered portions of said base layer by electroplating, with said second metallic layer extending through the apertures on the bores thereof and leaving an opening through each such aperture of sufficient size to receive the aforementioned terminal connections, and removing from the surfaces of the insulating panel said resist material and the portions of said metallic base layer underlying said resist material.

3. A process such as defined in claim 1 in which said resist material is applied to said metallic base layer on both sides of the panel by a squeegeeing action through respective stencil screens.

4. A process such as defined in claim 2 in which said treating of the surfaces of both sides of the panel comprises mechanical roughening.

5. A process for forming isolated electrical conductors upon each of both sides of a thin insulating panel which has a plurality of apertures therein, and for forming conductive linings in the apertures adapted to receive terminal connections and adapted to interconnect certain ones of such conductors on opposite sides of the panel, which method includes, treating the surfaces of both sides of the panel to increase the adhesion characteristics of such surfaces, spraying the treated surfaces of both sides of the panel and the bores of the apertures therein with a stannous chloride solution to sensitize such surfaces and bores, rinsing the panel to reduce the stannous chloride to a trace, dual spraying a silver salt solution and a reducing solution onto the treated sensitized surfaces of both sides of the panel and onto the bores of the apertures therein to coat such surfaces and bores with a continuous silver base layer, with said base layer forming a conductive lining for the apertures of a thickness small as compared with the cross-sectional dimensions of the respective apertures, applying a resist material to said base layer on both sides of the panel to mask against electroplating portions of the surfaces thereof on which no final conductor is to appear and to leave uncovered the apertures and isolated portions of each of the surfaces on which final conductors are to appear, with certain ones of the uncovered portions on both sides of the panel extending to corresponding ones of the apertures, coating a copper metallic layer on said uncovered portions of said silver base layer by electroplating, with said copper metallic layer extending through the apertures on the bores thereof, and leaving an opening through each such aperture of sufficient size to receive the aforementioned terminal connections, removing said resist material from the surfaces of the panel, and removing those portions of the silver base layer previously underlying said resist material.

6. A process for forming electrical conductors upon both sides of a thin insulating panel which has a plurality of apertures therein with certain ones of the electrical conductors on at least one side of the panel being isolated from one another, and for forming conductive linings in the apertures adapted to receive terminal connections and adapted to interconnect certain ones of such conductors on opposite sides of the panel, which method includes spraying a metal compound solution and a reducing solution onto both sides of the panel and onto the bores of the apertures in the panel so as to have on both such sides and bores a continuous metallic base extending into the apertures and forming a conductive lining for the apertures of a thickness small as compared with the cross-sectional dimensions of the respective apertures, applying a resist material on both sides of the panel to mask against electro-plating those portions of the sides of the panel on which no final conductors are to appear and to leave uncovered the apertures and those portions of the sides of the panel on which final conductors are to appear with certain ones of the uncovered portions on at least one side of the panel being isolated from one another and with certain ones of the uncovered portions on both sides of the panel extending to corresponding ones of the apertures, coating a metallic layer on the uncovered portions of said metallic base by electroplating, with said metallic layer extending through the apertures on the bores thereof and leaving an opening through each such aperture of sufficient size to receive the aforementioned terminal connections, and removing from both sides of the insulating panel said resist material and portions of the metallic base underlying said resist material.

References Cited in the file of this patent

UNITED STATES PATENTS

| | | |
|---|---|---|
| 653,024 | King | July 3, 1900 |
| 1,563,731 | Ducas | Dec. 1, 1925 |
| 1,942,686 | Colbert et al. | Jan. 9, 1934 |
| 2,214,646 | Walker | Sept. 10, 1940 |
| 2,257,143 | Wood | Sept. 30, 1941 |
| 2,433,384 | McLarn | Dec. 30, 1947 |
| 2,441,960 | Eisler | May 25, 1948 |
| 2,443,119 | Rubin | June 8, 1948 |
| 2,506,604 | Lokker et al. | May 9, 1950 |
| 2,521,648 | Ott | Sept. 5, 1950 |

FOREIGN PATENTS

| | | |
|---|---|---|
| 2,675 | Great Britain | of 1862 |

OTHER REFERENCES

Printed Circuit Technique, Nat. Bur. Stand. Circ. 468, pp. 1–26, November 15, 1947.